(12) United States Patent
Zeng et al.

(10) Patent No.: US 12,031,865 B2
(45) Date of Patent: Jul. 9, 2024

(54) MULTI-PARAMETER TEST AND CALIBRATION SYSTEM AND METHOD FOR SPECTROMETER BASED ON NANOSECOND LIGHT SOURCE

(71) Applicant: Chengdu University of Technology, Chengdu (CN)

(72) Inventors: Guoqiang Zeng, Chengdu (CN); Min Gu, Chengdu (CN); Qing Li, Chengdu (CN); Chuanhao Hu, Chengdu (CN); Xiaofeng Yang, Chengdu (CN); Shimin Hu, Chengdu (CN); Jian Yang, Chengdu (CN)

( * ) Notice: Subject to any disclaimer, the term of this patent is extended or adjusted under 35 U.S.C. 154(b) by 180 days.

(21) Appl. No.: 17/724,944

(22) Filed: Apr. 20, 2022

(65) Prior Publication Data

US 2023/0008042 A1    Jan. 12, 2023

(30) Foreign Application Priority Data

Jul. 12, 2021    (CN) .......................... 202110782575.3

(51) Int. Cl.
*G01J 3/28*    (2006.01)
*G01J 3/02*    (2006.01)

(52) U.S. Cl.
CPC .............. *G01J 3/0297* (2013.01); *G01J 3/28* (2013.01)

(58) Field of Classification Search
CPC .... G01J 3/02; G01J 3/0297; G01J 3/28; G01J 3/14; G01J 3/18; G01T 7/005
See application file for complete search history.

(56) References Cited

U.S. PATENT DOCUMENTS 3,179,801 A * 4/1965 Scherbatskoy ........... G01T 1/40
250/252.1

OTHER PUBLICATIONS

National Intellectual Property Administration of the People's Republic of China; First Office Action for Application No. 202110782575.3 dated Mar. 28, 2023.
National Intellectual Property Administration of the People's Republic of China; Second Office Action for Application No. 202110782575.3 dated Jul. 25, 2023.

* cited by examiner

*Primary Examiner* — Abdullahi Nur
(74) *Attorney, Agent, or Firm* — Parsons Behle & Latimer (57) ABSTRACT

The present disclosure provides a multi-parameter calibration system for a spectrometer based on a nanosecond light source, including a main channel for outputting nuclear pulse signals, and a coincidence channel for outputting the nuclear pulse signals. Each channel uses current nuclear pulse signals to drive a light-emitting diode (LED) to emit nuclear pulse optical signals, and a simulated scintillator is irradiated to emit nanosecond nuclear pulse optical signals. The present disclosure can respectively test and calibrate multiple parameter performance indexes of the spectrometer throughput baseline restoration spectrometer. The stability of the spectrometer is tested and calibrated through output of certain regular nuclear pulse signals.

19 Claims, 9 Drawing Sheets

MULTI-PARAMETER TEST AND CALIBRATION SYSTEM AND METHOD FOR SPECTROMETER BASED ON NANOSECOND LIGHT SOURCE

CROSS REFERENCE TO RELATED APPLICATION

This patent application claims the benefit and priority of Chinese Patent Application No. 202110782575.3, filed on Jul. 12, 2021, the disclosure of which is incorporated by reference herein in its entirety as part of the present application.

TECHNICAL FIELD

The present disclosure belongs to the field of spectrometer equipment, and in particular, relates to a multi-parameter test and calibration system and a test and calibration method for a spectrometer based on a nanosecond light source.

BACKGROUND ART

The research of the γ-spectrometer is of great significance for the analysis of radioactive sources, and is of great significance in the fields of environmental monitoring, nuclear test physics research, medical industry, nuclear physics teaching experiment, and national defense security. The parameters and performance of the γ-spectrometer also determine the action range of the spectrometer. The current spectrometer is gradually developing towards multi-parameter extraction. But there is no specialized equipment to calibrate and test the parameters and performance of the spectrometer.

In order to solve the above problems, the present disclosure designs and implements a multi-parameter test and calibration system for a spectrometer based on a nanosecond light source.

SUMMARY

An objective of the present disclosure is to provide a multi-parameter test and calibration system for a spectrometer based on a nanosecond light source, which can measure the performances such as the accuracy and efficiency of coincidence and anti-coincidence instruments and equipment.

To achieve the above objective, the present disclosure adopts the following technical solutions:

A multi-parameter test and calibration system for a spectrometer based on a nanosecond light source includes an upper computer, a ZYNQ system-on-chip (SoC) processor, a double data rate 3 (DDR3) memory, an embedded multimedia card (EMMC), a power supply unit, a main channel for outputting nuclear pulse signals, and a coincidence channel for outputting the nuclear pulse signals. The upper computer is connected to the ZYNQ SoC processor, the DDR3 memory and the EMMC are connected to the ZYNQ SoC processor respectively, the ZYNQ SoC processor is connected to the main channel for outputting the nuclear pulse signals and the coincidence channel for outputting the nuclear pulse signals respectively, and the main channel for outputting the nuclear pulse signals and the coincidence channel for outputting the nuclear pulse signals are connected to the upper computer respectively.

As a further elaboration of the above technical solution: the upper computer may be connected to the ZYNQ SoC processor through a network port.

As a further elaboration of the above technical solution: the ZYNQ SoC processor may include an advanced reduced instruction set computer (RISC) machine (ARM) unit and a field programmable gate array (FPGA) unit, the ARM unit may be connected to the FPGA unit through an advanced extensible interface (AXI) bus, and the EMMC may be connected to the ARM unit of the ZYNQ SoC processor through a general input-output (IO) port.

As a further elaboration of the above technical solution: the main channel for outputting the nuclear pulse signals may include a digital-to-analog converter (DAC) chip, a differential to single-ended unit, a light-emitting diode (LED), an optical filter, a photomultiplier tube (PMT), a preamplifier, and a to-be-tested spectrometer system. The DAC may be connected to the FPGA unit of the ZYNQ SoC processor, input of the differential to single-ended unit may be connected to an output pin of the DAC, output of the differential to single-ended unit may be connected to the LED, the optical filter may be attached between the PMT and the LED, an output terminal of the PMT may be connected to the preamplifier, and the preamplifier may be connected to a main channel of the to-be-tested spectrometer system.

As a further elaboration of the above technical solution: the main channel for outputting the nuclear pulse signals may include a DAC chip, a differential to single-ended unit, an LED, an optical filter, a PMT, a preamplifier, and a to-be-tested spectrometer system. The DAC may be connected to the FPGA unit of the ZYNQ SoC processor, input of the differential to single-ended unit may be connected to an output pin of the DAC, output of the differential to single-ended unit may be connected to the LED, the optical filter may be attached between the PMT and the LED, an output terminal of the PMT may be connected to the preamplifier, and the preamplifier may be connected to a Compton scattering anti-coincidence measurement channel of the to-be-tested spectrometer system.

As a further elaboration of the above technical solution: the to-be-tested spectrometer system may be connected to the upper computer through a universal serial bus (USB) 3.0.

As a further elaboration of the above technical solution: the upper computer may be a personal computer (PC).

As a further elaboration of the above technical solution: the power supply unit may be connected to the upper computer, the ZYNQ SoC processor, the DDR3 memory, the EMMC, the main channel for outputting the nuclear pulse signals, and the coincidence channel for outputting the nuclear pulse signals respectively.

A test and calibration method for a multi-parameter test and calibration system for a spectrometer based on a nanosecond light source includes the following steps:

(1) obtaining, by an upper computer, an energy spectrum curve 1 required for output of a main channel and an energy spectrum curve 2 required for output of a coincidence channel using a large amount of measured data and Monte Carlo simulation according to functions selected by a user;

(2) when the ZYNQ SoC processor obtains the energy spectrum curve 1, inverting the energy spectrum curve 1 into a series of nuclear pulse signals, or directly outputting nuclear pulse signals containing one or more rise times and fall times according to different functions selected by the user, and outputting the nuclear pulse signals at random or fixed time intervals in the main channel after corresponding processing according to different functions;

(3) calculating, by the ZYNQ SoC processor, correlation between the nuclear pulse signals output from the coincidence channel and the nuclear pulse signals of the main channel according to the functions and parameters set by the user;

(4) when the ZYNQ SoC processor obtains the energy spectrum curve 2, inverting the energy spectrum curve 2 into a series of nuclear pulse signals, and outputting the nuclear pulse signals in the coincidence channel according to the correlation between the nuclear pulse signals of the main channel and the nuclear pulse signals of the coincidence channel; and (5) after the nuclear pulse signals output from each channel are acquired by the to-be-tested spectrometer, comparing acquired information with data generated according to the parameters set by the user, so as to test and calibrate multiple parameters of the spectrometer.

As a further elaboration of the above technical solution: a method for outputting the nuclear pulse signals from the main channel and the coincidence channel may be as follows: converting, by a DAC, digital signals into analog nuclear pulse signals, converting, by a differential to single-ended unit, differential signals into single-ended nuclear pulse signals, converting, by an LED, nuclear pulse current signals into optical signals, converting, by a PMT, the optical signals into electrical signals, conditioning and outputting, by a preamplifier, PMT anode signals, and receiving, by a to-be-tested spectrometer system, the nuclear pulse signals of the two channels and comparing the nuclear pulse signals with the data generated according to the parameters set by the user, so as to test and calibrate multiple parameters of the spectrometer.

As a further elaboration of the above technical solution: in step (1), the functions selected by the user may include the calibration and test of multiple parameters such as the coincidence and anti-coincidence performance test and calibration of the spectrometer, the broadening test of a spectral line after spectrometer detection, the resolution test and calibration of the spectrometer, the distortion degree of the spectral line, the test and calibration of the throughput and the counting rate of the spectrometer, the dead time test and calibration of the spectrometer, the baseline restoration capability and direct current (DC) offset accuracy of the spectrometer, the energy detection range of the spectrometer, the spectrum stabilization performance test and calibration of the spectrometer, the signal-to-noise ratio improvement capability of the spectrometer, the working performance test of various preamplifiers, the pulse shape discrimination capability, the accuracy test and calibration of the rise time and fall time of extracted nuclear pulse signals, the effect test of a shaping algorithm, the analysis of signal acquisition accuracy of the spectrometer, and the stability test of the spectrometer.

As a further elaboration of the above technical solution: in step (2), the corresponding processing may be as follows: when the baseline restoration capability of the spectrometer is selected to be tested, coupling a DC offset to the nuclear pulse signal; and when the signal-to-noise ratio improvement capability test function of the spectrometer is selected, coupling high-frequency noise to the nuclear pulse signal, where no processing is done when other functions are selected.

The present disclosure has the following beneficial effects.

In the present disclosure, the Compton scattering spectral line obtained using a large amount of measured data and Monte Carlo simulation is closer to the real data. The true value of the peak-to-Compton ratio is clarified, and the spectral line is inverted in the lower computer to generate random nuclear pulse signals. According to the principle of Compton scattering, when the main channel randomly outputs the nuclear pulse signals, the coincidence channel also outputs the nuclear pulse signals related to the main channel signals, and the correlation shows that the sum of the energy of the two nuclear pulse signals is not greater than the energy of the nuclear pulse signals when there is no Compton scattering, which further restores the scene of Compton scattering of the real radioactive source in the detector.

The present disclosure can test and calibrate multiple parameters of the spectrometer, including coincidence and anti-coincidence performance, the broadening test of a spectral line, the resolution, the distortion degree of the spectral line, the throughput and the counting rate, the dead time, the baseline restoration capability and DC offset accuracy, and the energy detection range, and can test and calibrate the spectrum stabilization performance of the spectrometer, the signal-to-noise ratio improvement capability, the working performance of various preamplifiers, the pulse shape discrimination capability, the rise time and fall time accuracy of extracted nuclear pulse signals, the implementation effect of a shaping algorithm, and the signal acquisition accuracy. The stability of the spectrometer is tested and calibrated through certain regular nuclear pulse signal output. This greatly reduces the difficulty of developing and testing the spectrometer.

BRIEF DESCRIPTION OF THE DRAWINGS

To describe the technical solutions in the embodiments of the present disclosure or in the prior art more clearly, the drawings that need to be used in the description of the embodiments or the prior art will be briefly introduced below. Obviously, other drawings can be obtained by those of ordinary skill in the art based on these drawings without creative work.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art on the basis of the embodiments of the present disclosure without creative efforts shall fall within the protection scope of the present disclosure.

Figure 1:
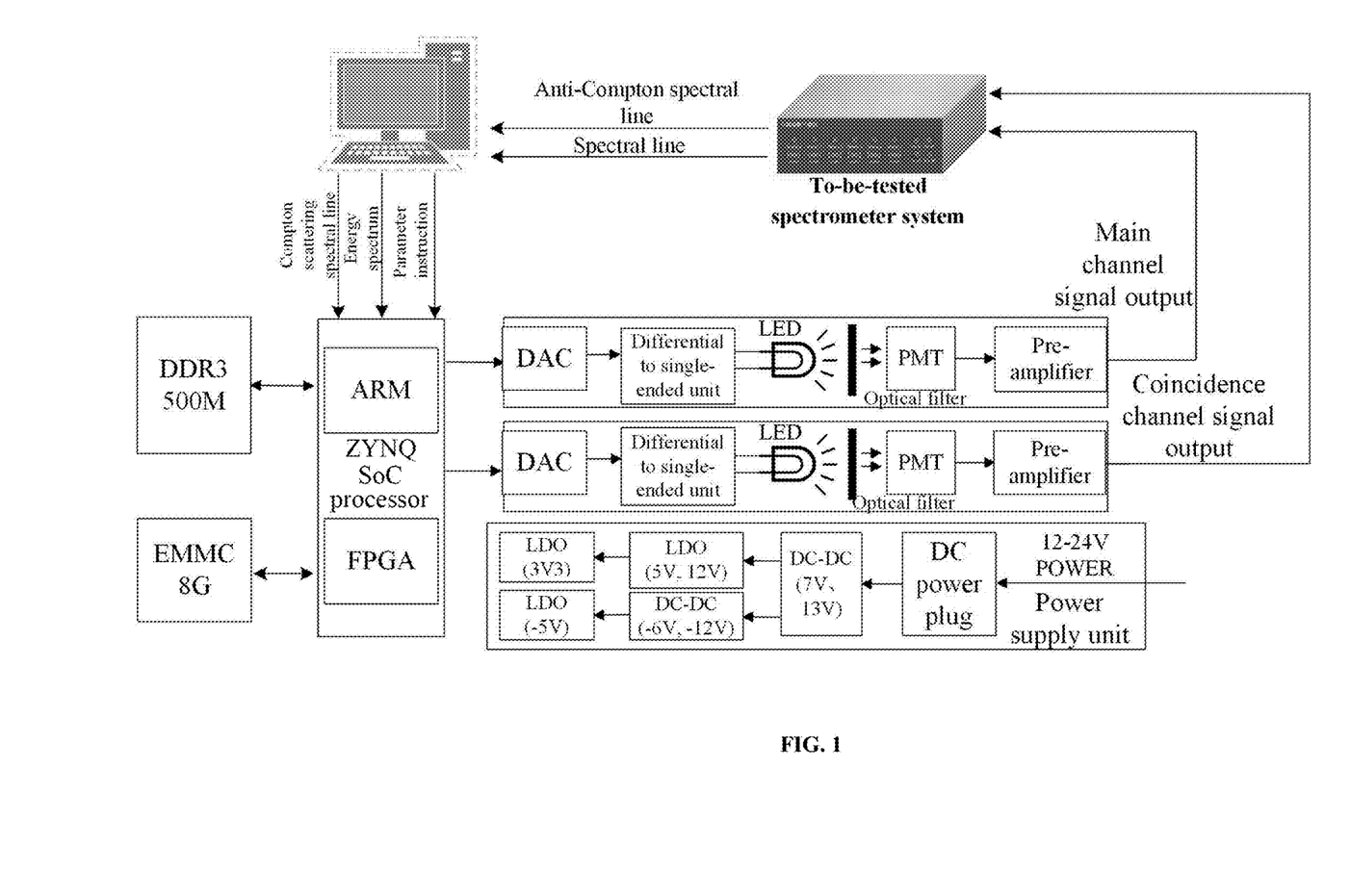
FIG. 1 is a schematic structural diagram of a multi-parameter test and calibration system for a spectrometer based on a nanosecond light source provided by the present disclosure.

As shown in FIG. 1, a multi-parameter test and calibration system for a spectrometer based on a nanosecond light source includes an upper computer, a ZYNQ SoC processor, a DDR3 memory, an EMMC, a power supply unit, a main channel for outputting nuclear pulse signals, and a coincidence channel for outputting the nuclear pulse signals. The upper computer is connected to the ZYNQ SoC processor, the DDR3 memory and the EMMC are connected to the ZYNQ SoC processor respectively, the ZYNQ SoC processor is connected to the main channel for outputting the nuclear pulse signals and the coincidence channel for outputting the nuclear pulse signals respectively, and the main channel for outputting the nuclear pulse signals and the coincidence channel for outputting the nuclear pulse signals are connected to the upper computer respectively. The power supply unit is connected to the upper computer, the ZYNQ SoC processor, the DDR3 memory, the EMMC, the main channel for outputting the nuclear pulse signals, and the coincidence channel for outputting the nuclear pulse signals respectively.

In the present embodiment, the upper computer is connected to the ZYNQ SoC processor through a network port. The ZYNQ SoC processor includes an ARM unit and a FPGA unit, the ARM unit is connected to the FPGA unit through an AXI bus, and the EMMC is connected to the ARM unit of the ZYNQ SoC processor through a general IO port.

In the present embodiment, the main channel for outputting the nuclear pulse signals includes a DAC chip, a differential to single-ended unit, an LED, an optical filter, a PMT, a preamplifier, and a to-be-tested spectrometer system. The DAC is connected to the FPGA unit of the ZYNQ SoC processor, input of the differential to single-ended unit is connected to an output pin of the DAC, output of the differential to single-ended unit is connected to the LED, the optical filter is attached between the PMT and the LED, an output terminal of the PMT is connected to the preamplifier, and the preamplifier is connected to a main channel of the to-be-tested spectrometer system.

In the present embodiment, the main channel for outputting the nuclear pulse signals includes a DAC chip, a differential to single-ended unit, an LED, an optical filter, a PMT, a preamplifier, and a to-be-tested spectrometer system. The DAC is connected to the FPGA unit of the ZYNQ SoC processor, input of the differential to single-ended unit is connected to an output pin of the DAC, output of the differential to single-ended unit is connected to the LED, the optical filter is attached between the PMT and the LED, an output terminal of the PMT is connected to the preamplifier, and the preamplifier is connected to a Compton scattering anti-coincidence measurement channel of the to-be-tested spectrometer system.

In the present embodiment, the to-be-tested spectrometer system is connected to the upper computer through a USB3.0. Preferably, the upper computer is a personal computer (PC).

For test and calibration of other parameters: similar to the Compton scattering coincidence anti-coincidence measurement, according to the parameters set by the upper computer, the upper computer generates an energy spectrum curve, and the lower computer inverts the energy spectrum curve into random nuclear pulse signal output; Or according to the measurement function selected by the upper computer, various nuclear pulse signals with different rise times, fall times, and amplitudes can be directly output in the FPGA, and the output time of the nuclear pulse signals can also be set arbitrarily.

According to the set parameters, different coincidence measurement nuclear pulse signals are output. In the real radiation environment, the difference in particle information such as probability and energy of Compton scattering due to different detectors, different detection efficiencies, and different radioactive sources is simulated.

Based on the above hardware platform, the present disclosure can test and calibrate multiple parameters of the spectrometer, and can respectively realize test and calibration of the coincidence and anti-coincidence performance of the spectrometer, the broadening test of the spectral line after spectrometer detection, and the resolution test and calibration of the spectrometer to the nuclear pulse signals. The spectral line formed by the spectrometer is compared with the spectral line output from the system to obtain the distortion degree of the spectral line of the spectrometer. The output frequency of the nuclear pulse signal of the system is changed to test and calibrate the throughput and counting rate of the spectrometer. When the system outputs the nuclear pulse signal according to a certain rule, the dead time of the spectrometer can also be tested and calibrated. When a DC offset is added to the output nuclear pulse signal, the baseline restoration capability and the DC offset accuracy of the spectrometer can be tested and calibrated. When there is a certain linear relationship, nuclear pulse signals of different amplitudes are output to test and calibrate the energy detection range of the spectrometer, and the spectrum stabilization performance of the spectrometer can be tested and calibrated. When the output nuclear pulse signal is coupled to noise, the signal-to-noise ratio improvement capability of the spectrometer can be tested. The present disclosure can replace the voltage, current, and charge-sensitive preamplifiers to test the working performance of various preamplifiers. Various nuclear pulse signals containing different rise times and fall times are output according to a certain rule to test the pulse shape discrimination capability of the spectrometer. The rise time and fall time accuracy of extracted nuclear pulse signals are tested and calibrated. The shaping algorithm of the spectrometer can also be tested and calibrated. By comparing the amplitude of the output pulse shape of the system and the acquired pulse shape of the spectrometer, the problem of signal acquisition accuracy is analyzed. The stability of the spectrometer is tested and calibrated through certain regular nuclear pulse signal output.

Working principle:

The upper computer uses a large amount of measured data and Monte Carlo simulation to obtain an energy spectrum curve 1 with a smaller peak-to-Compton ratio and an energy spectrum curve 2 with a larger peak-to-Compton ratio under the same radioactive source environmental conditions, and an ideal energy spectrum curve 3 containing only Compton scattering can be obtained by algorithmic processing of the two energy spectrum curves. If the ZYNQ SoC processor obtains the energy spectrum curve 1, the spectral line is inverted into a series of nuclear pulse signals, which will be output randomly in the main channel. If the ZYNQ SoC processor obtains an energy spectrum curve 4, the spectral line will be inverted into a series of probability distribution tables, part of the nuclear pulse in the main channel is randomly selected for marking according to the probability table, the coincidence channel also outputs nuclear pulse signals while the main channel outputs the marked nuclear pulse, and there is a certain proportional relationship between the amplitude information of the nuclear pulse signals output from the two channels at the same time, while the coincidence channel is closed when the main channel outputs unmarked nuclear pulse signals.

A test and calibration method for a multi-parameter test and calibration system for a spectrometer based on a nanosecond light source includes the following steps.

(1) An upper computer obtains an energy spectrum curve 1 required for output of a main channel and an energy spectrum curve 2 required for output of a coincidence channel using a large amount of measured data and Monte Carlo simulation according to functions selected by a user.

(2) When the ZYNQ SoC processor obtains the energy spectrum curve 1, the energy spectrum curve 1 is inverted into a series of nuclear pulse signals, or nuclear pulse signals containing one or more rise times and fall times are directly output according to different functions selected by the user, and the nuclear pulse signals are output at random or fixed time intervals in the main channel after corresponding processing according to different functions.

(3) The ZYNQ SoC processor calculates correlation between the nuclear pulse signals output from the coincidence channel and the nuclear pulse signals of the main channel according to the functions and parameters set by the user.

(4) When the ZYNQ SoC processor obtains the energy spectrum curve 2, the energy spectrum curve 2 is inverted into a series of nuclear pulse signals, and the nuclear pulse signals in the coincidence channel are output according to the correlation between the nuclear pulse signals of the main channel and the nuclear pulse signals of the coincidence channel.

(5) After the nuclear pulse signals output from each channel are acquired by the to-be-tested spectrometer, acquired information is compared with data generated according to the parameters set by the user, so as to test and calibrate multiple parameters of the spectrometer.

In the present embodiment, a method for outputting the nuclear pulse signals from the main channel and the coincidence channel is as follows: a DAC converts digital signals into analog nuclear pulse signals, a differential to single-ended unit converts differential signals into single-ended nuclear pulse signals, an LED converts nuclear pulse current signals into optical signals, a PMT converts the optical signals into electrical signals, a preamplifier conditions and outputs PMT anode signals, and a to-be-tested spectrometer system receives the nuclear pulse signals of the two channels and compares the nuclear pulse signals with the data generated according to the parameters set by the user, so as to test and calibrate multiple parameters of the spectrometer.

In step (1), the functions selected by the user include the calibration and test of multiple parameters such as the coincidence and anti-coincidence performance test and calibration of the spectrometer, the broadening test of a spectral line after spectrometer detection, the resolution test and calibration of the spectrometer, the distortion degree of the spectral line, the test and calibration of the throughput and the counting rate of the spectrometer, the dead time test and calibration of the spectrometer, the baseline restoration capability and DC offset accuracy of the spectrometer, the energy detection range of the spectrometer, the spectrum stabilization performance test and calibration of the spectrometer, the signal-to-noise ratio improvement capability of the spectrometer, the working performance test of various preamplifiers, the pulse shape discrimination capability, the accuracy test and calibration of the rise time and fall time of extracted nuclear pulse signals, the effect test of a shaping algorithm, the analysis of signal acquisition accuracy of the spectrometer, and the stability test of the spectrometer.

In step (2), the corresponding processing is as follows: when the baseline restoration capability of the spectrometer is selected to be tested, a DC offset is coupled to the nuclear pulse signal; and when the signal-to-noise ratio improvement capability test function of the spectrometer is selected, high-frequency noise is coupled to the nuclear pulse signal, and no processing is done when other functions are selected.

The present disclosure can realize two-way nuclear pulse signal output, and the two-way signal output signal is random, and according to the set parameters, different nuclear pulse signals are output in accordance with the measurement. Therefore, the following is the specific implementation method.

1. Main Channel Nuclear Pulse Signal Output

Figure 2:
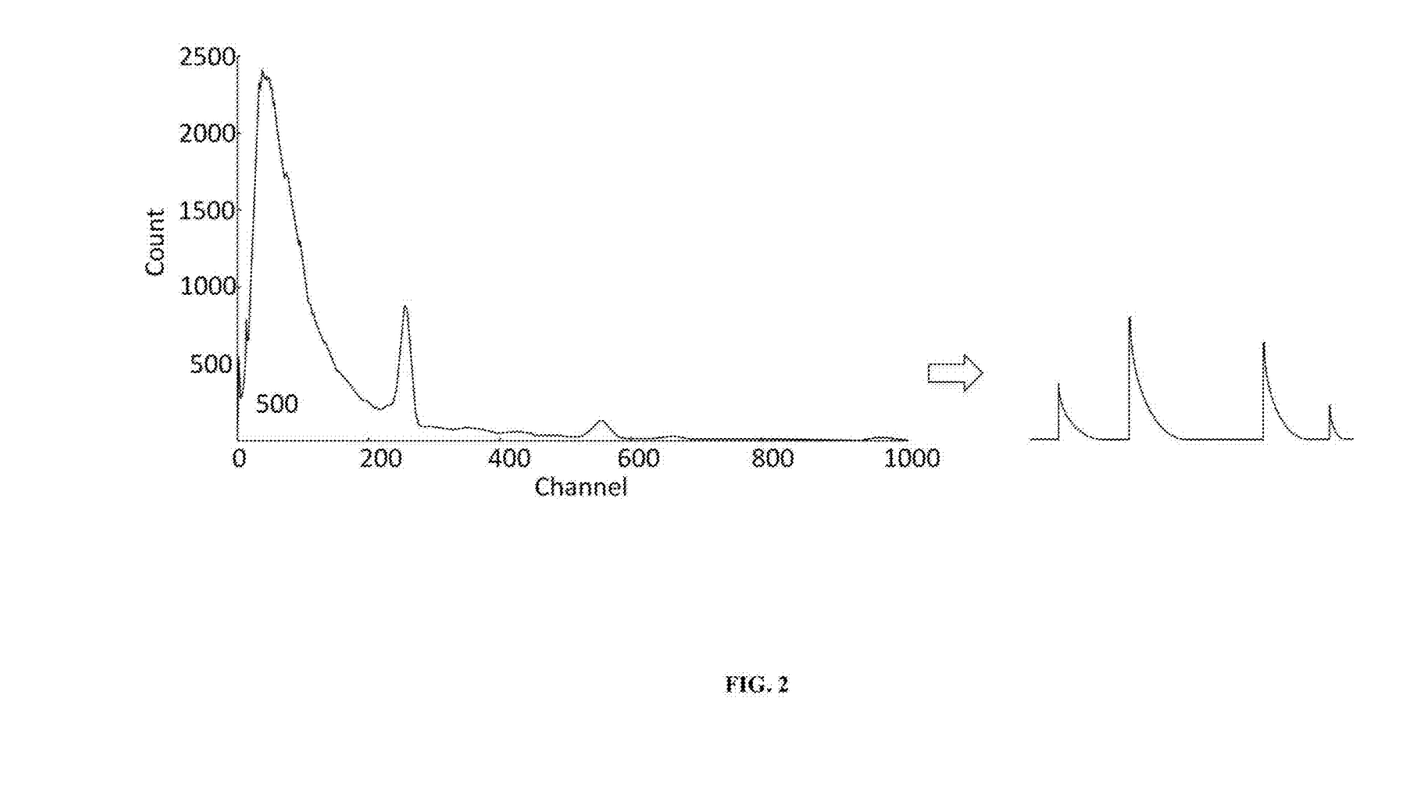
FIG. 2 is a schematic diagram of spectral line inversion.

The spectral lines sent by the upper computer are inverted to generate a series of nuclear pulse signals with random amplitude and time through a certain algorithm, and then the nuclear pulse signals are output through the main channel, as shown in FIG. 2.

2. Compton Scattering Discrimination

During inversion of the energy spectrum curve 1 of the main detector, the generated single nuclear pulse signal is randomly marked as Compton scattering under the condition of Compton spectral line 2. The implementation process is as follows: the spectral line of 1024-channel resolution is taken as an example.

Figure 3:
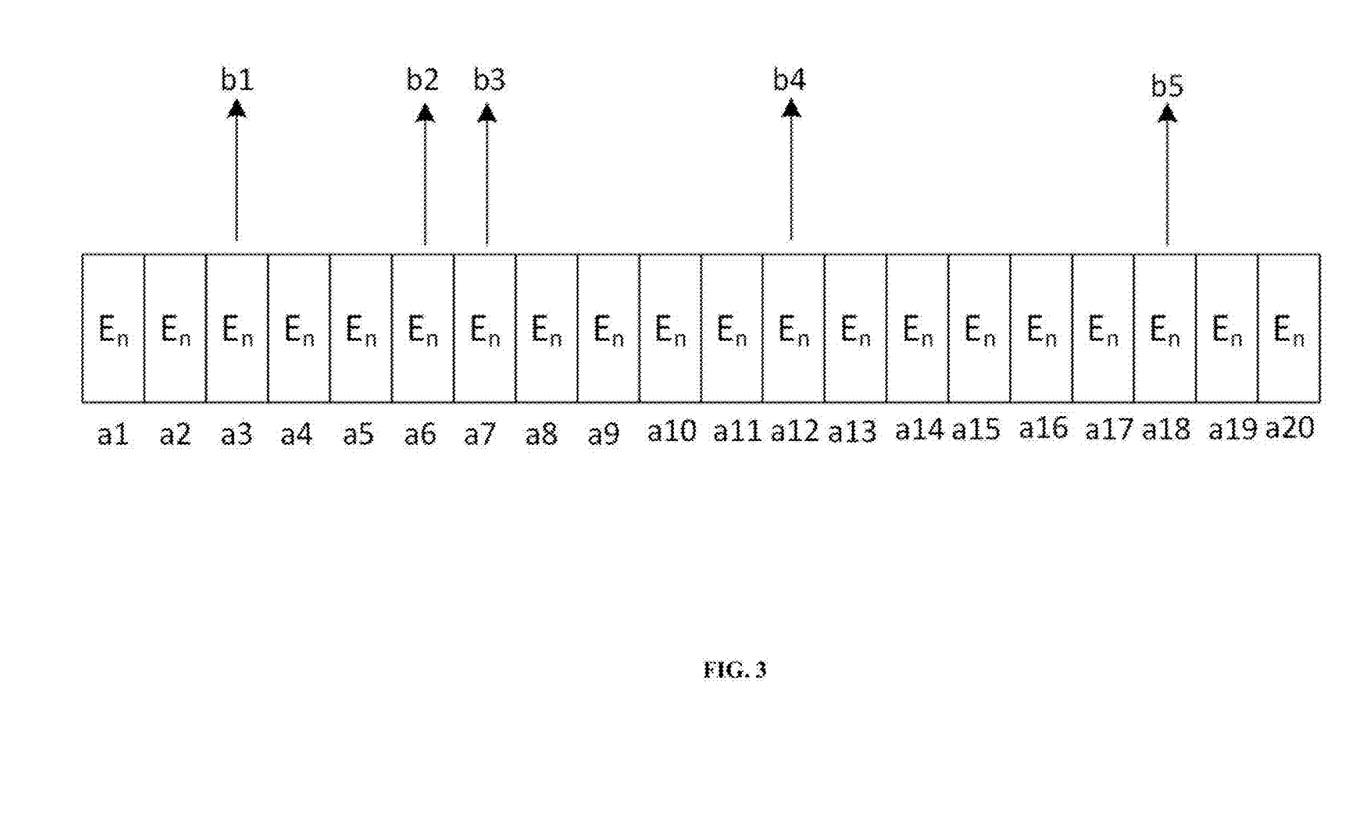
FIG. 3 is a Compton scattering distribution diagram.

It is assumed that there are a counts in the n-th channel of the energy spectrum curve of the main detector, and its energy is En, and the n-th channel of the Compton scattering energy spectrum curve has b counts, it can be known from the principle of Compton scattering that b<a, and when the main detector simulates output of 100 nuclear pulse signals with the energy of En, the b nuclear pulse signals are Compton scattering. These b nuclear pulse signals are randomly distributed among the nuclear pulses. As shown in FIG. 3, a=20, b=5, and the energy is En. The data of the other 1023 channels is the same.

3. Compton Scattering Randomness Marker

Figures 4, 5:
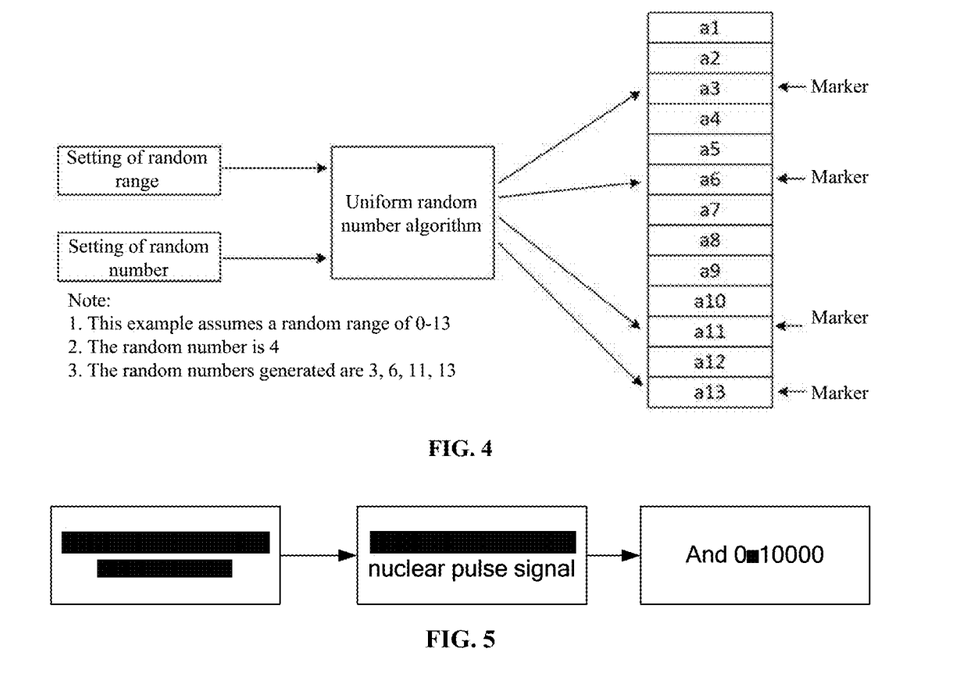
FIG. 4 is a schematic diagram of a method for generating randomness of Compton scattering.
FIG. 5 is a schematic diagram of a Compton scattering marking method.

Under the condition of 2, it can be known that the n-th channel needs to be inverted to generate a nuclear pulse signals, and there are b nuclear pulse signals that need to be marked as the nuclear pulse signal of Compton scattering. Therefore, the present disclosure uses a uniform distribution algorithm, sets the random number distribution range to 0-a, and generates b non-repetitive uniform random numbers. The random numbers are used as ordinal numbers, and the nuclear pulse signals of these ordinal numbers are marked as the nuclear pulse signals of Compton scattering, as shown in FIG. 4. Similarly, the nuclear pulse signals generated by other 1023 channels are marked with Compton scattering randomness. The marking method used by the present disclosure is to set the high 24 bits of the amplitude of the nuclear pulse signal to be marked as 1, as shown in FIG. 5.

4. Nuclear Pulse Signal Output of Coincidence Channel and Main Detector Channel

Figure 6:
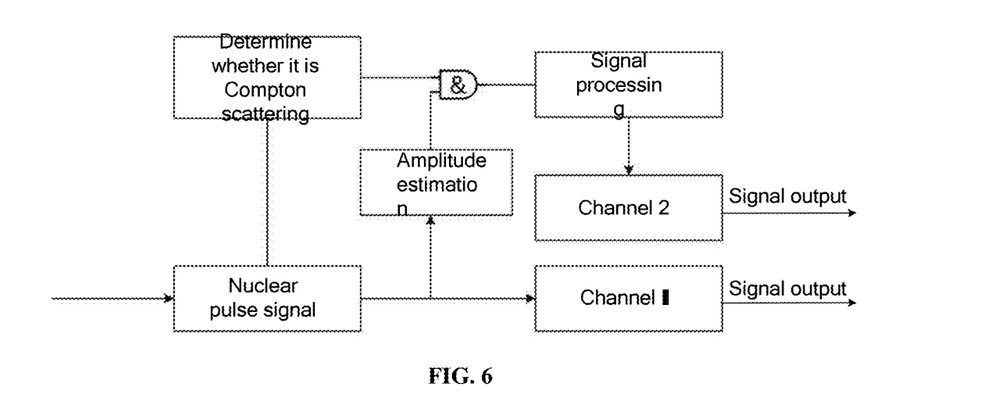
FIG. 6 is a design block diagram of a measurement method.
Figure 7:
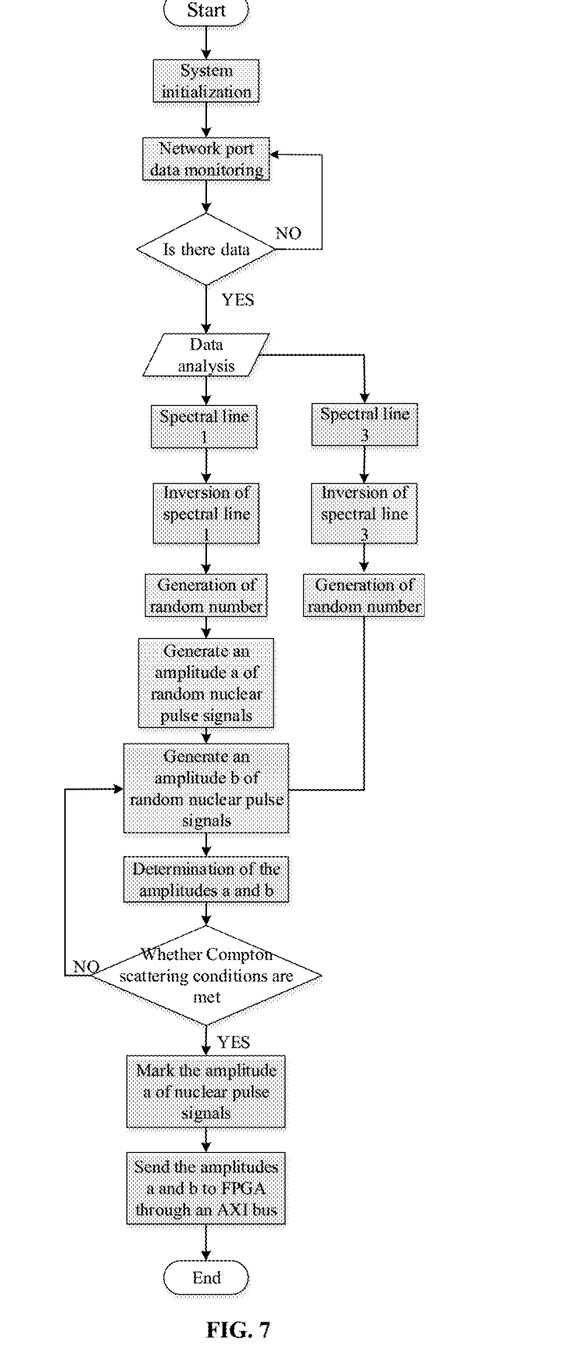
FIG. 7 is a program flow chart of an ARM unit.

When the main channel is outputting the nuclear pulse signal, whether the 24-th bit of the amplitude information of the nuclear pulse signal is high is first determined. If it is determined to be high, then when the channel 1 outputs the nuclear pulse signal, the channel 2 outputs the nuclear pulse signal at the same time, otherwise, the signal output of the channel 2 is disabled, which conforms to the design flow diagram, as shown in FIG. 6.

5. Quantification of Anti-Compton Performance of to-be-Tested System

Figure 12:
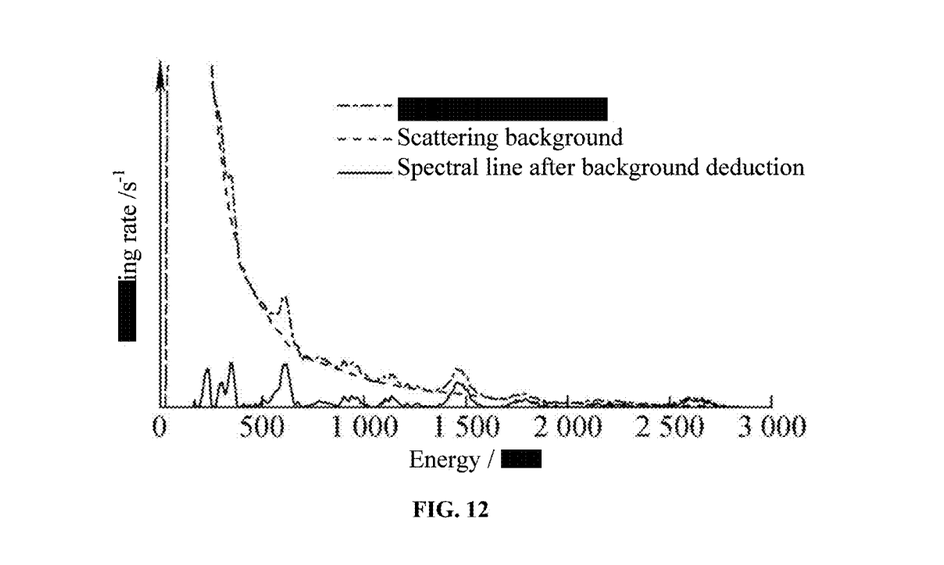
FIG. 12 is a comparison diagram before and after Compton scattering deduction.
Figure 13:
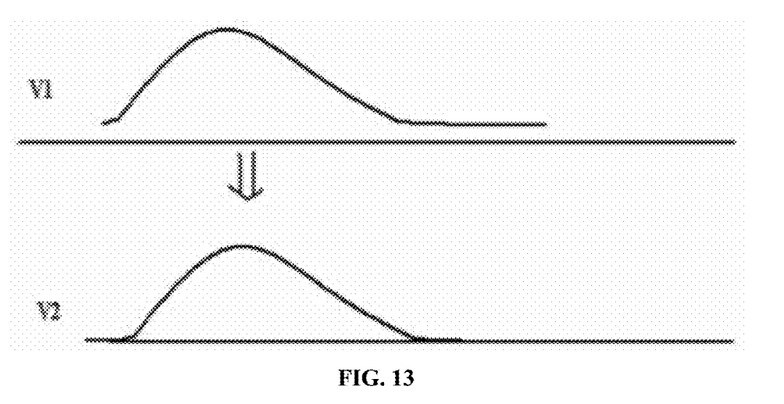
FIG. 13 is a pulse shape comparison diagram with a baseline and baseline deduction.

Experiment:

The occurrence of Compton scattering in the scintillator detector will have a great impact on the detection of the radioactive source signal by the spectrometer. At present, the spectrometer is generally subjected to coincidence and anti-coincidence measurement to reduce the influence of Compton scattering as much as possible. The general practice is to place another coincidence detector around the main detector. When Compton scattering occurs, both the main detector and the coincidence detector will output nuclear pulse signals, such that the spectrometer can selectively process Compton scattering nuclear pulse signals. FIG. 12 is a comparison diagram before and after Compton scattering deduction. The present disclosure simulates the signal output of the main detector and the coincidence detector by setting two-way signal output, and tests and calibrates the coincidence and anti-coincidence performance of the spectrometer by conditioning the signal output rule of the two channels.

The present disclosure designs two-way nuclear pulse signal output, the first-way analog output is the nuclear pulse signal detected by the main detector, and the second-way analog output is the nuclear pulse signal output from the coincidence detector due to Compton scattering.

The present disclosure is designed to calculate whether the nuclear pulse signal output from the main channel (channel 1) is a Compton scattering signal according to the Compton scattering spectral line sent by the upper computer.

When the main channel outputs the nuclear pulse signal, if the microprocessor determines that it is Compton scattering, the main channel (channel 1) and the coincidence channel (channel 2) simultaneously output the nuclear pulse signal. In the simulation, for the real Compton scattering, it can be considered to a certain extent that the photoelectrons generated by photoelectric effect of the scattered photons and the Compton electrons generated by the incident γ photons are simultaneous events.

The nuclear pulse signal output of the coincidence measurement channel (channel 2) is random. In the simulation, the nuclear pulse signal output from the main detector is random under real conditions, and the Compton scattering is also random, so the nuclear pulse signal generated on the coincidence detector is also random.

The present disclosure outputs different coincidence measurement nuclear pulse signals according to the set parameters, and simulates the difference of particle information such as probability and energy of Compton scattering caused by different detectors, different detection efficiencies, and different radioactive sources in a real radiation environment.

Figure 8:
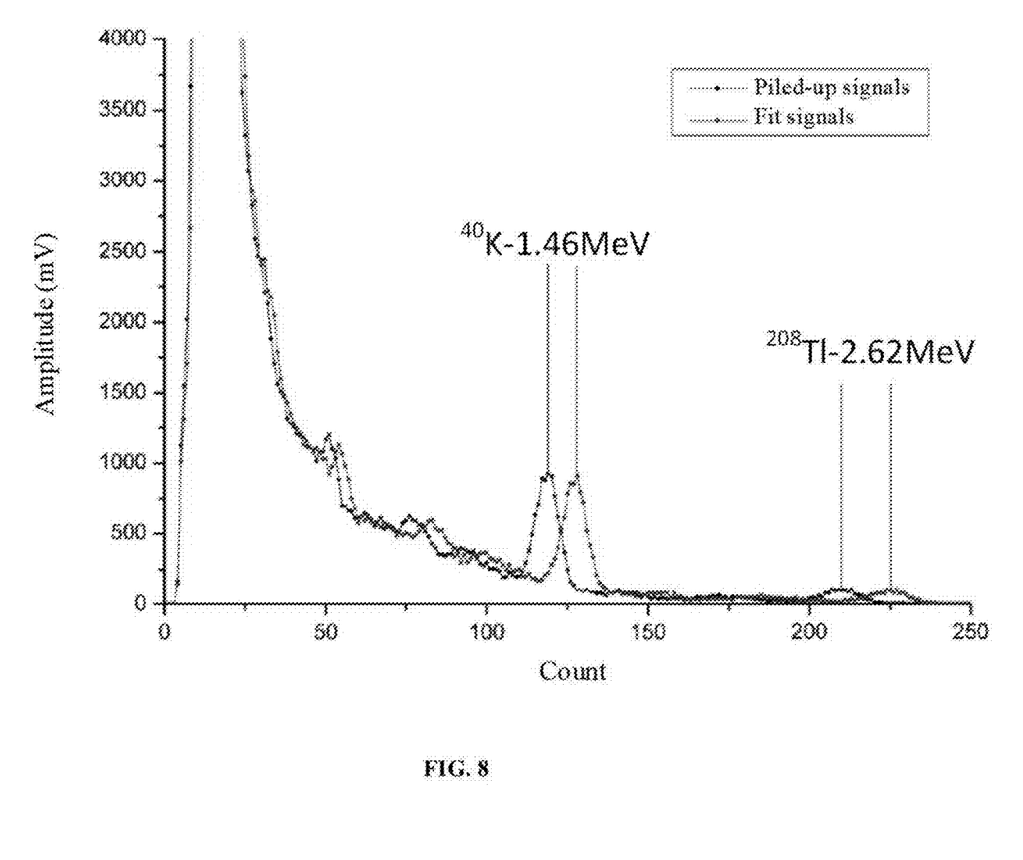
FIG. 8 is a comparison diagram of spectral lines.

Although the output pulse amplitude of the scintillator detector is directly proportional to the energy lost by the incident particles in the scintillator, due to the existence of statistical fluctuations, even for monoenergetic charged particles whose energy is completely lost in the scintillator, the output pulse amplitude corresponding to each particle also fluctuates, making the pulse amplitude spectrum of the monoenergetic charged particle approximately in Gaussian distribution. At the same time, due to the existence of PMT noise and electronic noise (generally, PMT noise is dominant), there is a continuous low-energy distribution on the amplitude spectrum that is independent of the incident particle energy. When the working voltage increases, the multiplication factor of the PMT increases rapidly, the amplitude of the pulse corresponding to a certain energy increase, and the single peak on the pulse amplitude spectrum will move to the right. At the same time, the noise amplitude increases, and the low-energy continuum spectrum corresponding to the noise will also extend to the right. These factors will lead to some distortion between the energy spectrum acquired by the spectrometer and the real energy spectrum. Therefore, the present disclosure generates an energy spectrum curve through the upper computer, and the lower computer inverts it into a series of random nuclear pulse signal output. The signal enters the to-be-tested spectrometer and is acquired to form an energy spectrum, and the energy spectrum is sent to the upper computer. By comparison with the energy spectrum generated by the upper computer, the energy spectrum distortion formed by the spectrometer can be tested, as shown in FIG. 8.

In the process of detecting the nuclear pulse signal by the spectrometer, the index of the counting rate is also very important. The present disclosure changes the frequency of the nuclear pulse signal output from the main channel, inputs the signal into the to-be-tested spectrometer, obtains the signal frequency acquired by the spectrometer, and compares them in sequence, so as to test the counting rate and the throughput of the spectrometer to be tested and calibrated.

In the working process of the spectrometer, there are charging and discharging processes due to the acquisition of pulse signals, and the discharging process, the randomness of radioactive particles, and the acquisition, discrimination, conversion, and storage of signals by the electronic system all require a certain amount of time, which leads to the failure time of the spectrometer system, that is, the dead time. The present disclosure outputs different nuclear pulse signals through specific rules, such that the dead time of the spectrometer can be tested and calibrated.

Since the parameters of different detectors including the preamplifier circuit cannot be completely consistent, there will be DC offsets of different amplitudes in the DC-coupled analog front-end circuit, and due to the temperature drift and time drift of the analog circuit, during measurement, it is very likely that an uncertain DC baseline drift will occur over time. If the pulse amplitude is always extracted according to the set baseline, there will be serious deviation. Therefore, baseline restoration processing is generally performed, that is, the baseline of each signal is extracted separately, and then deducted. The present disclosure tests and calibrates the baseline restoration capability of the spectrometer by adding a DC offset to each signal according to the parameters.

Since the nuclear pulse signal is a non-periodic pulse signal, in the alternating current (AC) coupling state, the baseline of the signal will have a relatively large offset with the change of pulse counting rate, which makes it difficult for the digital signal after analog-to-digital conversion to extract the baseline. In order to ensure that the baseline does not have a large offset during signal processing, the analog front-end circuits are all designed by DC coupling, so the DC offset of the signal needs to be adjusted before the signal enters the analog-to-digital converter (ADC). In the present disclosure, a DC offset is added to all signals, and the DC offset output can be adjusted arbitrarily, so as to test and calibrate the DC offset capability of the spectrometer.

For different scintillator detectors, the detection range of radiation energy is different. Therefore, the present disclosure can output the nuclear pulse signals conforming to the corresponding detector, and simulate signals of different energy by changing parameters such as the amplitude of the nuclear pulse signals, thereby testing and calibrating the energy detection range of the spectrometer.

"Spectral drift" is the main factor affecting the accuracy of the γ-spectrometer. Spectral drift refers to the change of peak position or spectrum shape of the instrument spectrum of the γ-spectrometer under certain conditions compared with the "standard spectrum" (for the same object) under given conditions. Spectral drift is mainly caused by the following two factors: the first is the change of ambient temperature, because the output signal of the detector (mostly using a scintillation counter at present) is affected by the working temperature, and the electronic system of the γ-spectrometer (mainly pulse amplifiers, pulse amplitude analyzers, and high-voltage power supplies) also have a certain temperature coefficient, and the second is the instability of the instrument, including the fatigue effect of components, the aging phenomenon, the stability of continuous operation of the instrument, and the anti-interference ability. Therefore, some form of spectrum stabilization device or spectrum stabilization system is generally adopted in the spectrometer. Therefore, it is of great significance to calibrate the spectrum stabilization performance of the spectrometer. The present disclosure adjusts the gain of the output nuclear pulse signal to shift the spectral line to the left or right by a specific number of channels, adjusts the number of channels of spectral line drift by changing the gain, and then measures the spectrum stabilization of the spectrometer, so as to calibrate the spectrum stabilization performance of the spectrometer.

The preamplifiers can be divided into voltage-sensitive preamplifiers, current-sensitive preamplifiers, and charge sensitive preamplifiers according to different working modes. The signal conditioning capability of the preamplifier is also an important parameter to measure the performance of the spectrometer. The present disclosure outputs different nuclear pulse signals according to different preamplifiers, and can arbitrarily adjust the output time interval of the signals, and a noise signal is coupled in the nuclear pulse signal to be jointly output to the LED. The LED illuminates the PMT, the PMT output signal passes through the preamplifier, and then the performance of the preamplifier to improve the signal-to-noise ratio, dead time, and throughput can be tested and calibrated.

Figure 10:
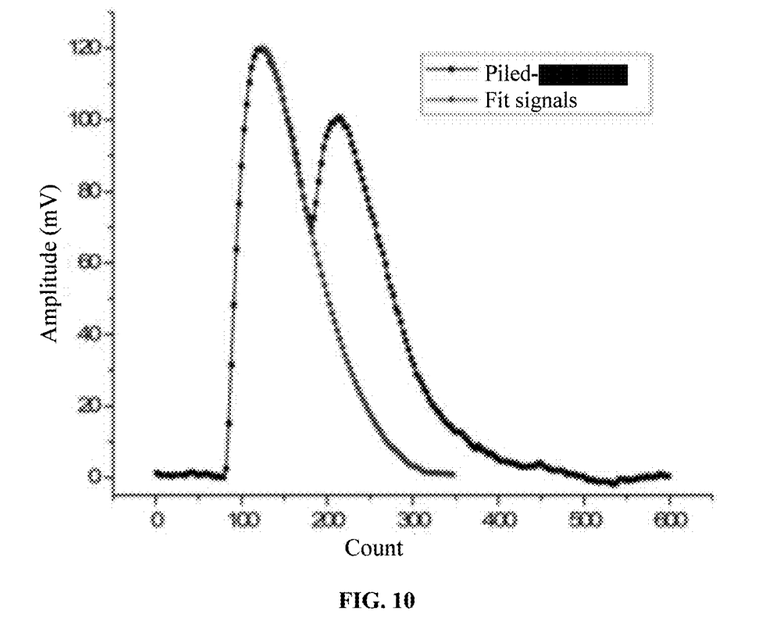
FIG. 10 is a schematic diagram of pileup of nuclear pulse signals.
Figure 11:
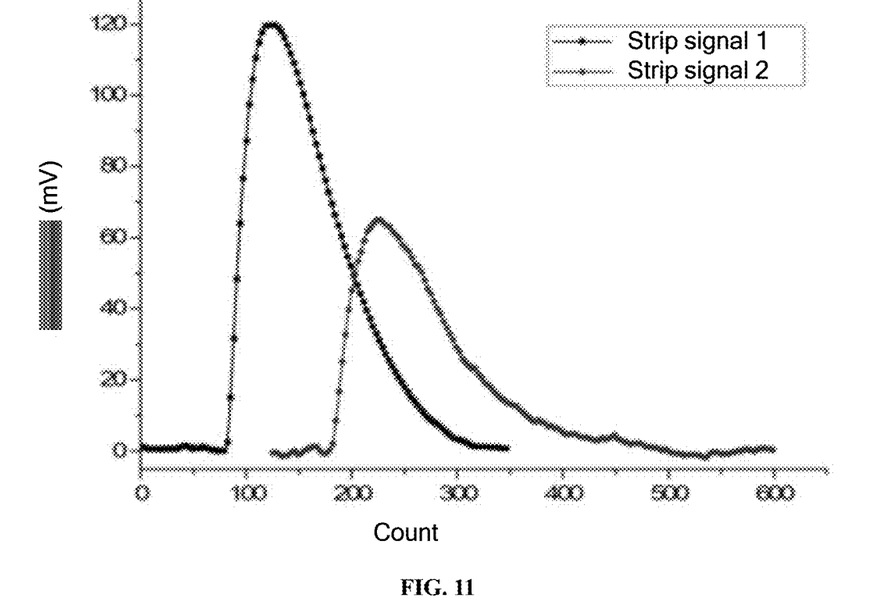
FIG. 11 is a schematic diagram of recovery of the piled-up nuclear pulse signals.

The useful information that a linear pulse carries is its amplitude (and time of occurrence). However, there are occasions where the pulse shape also shows some importance in nuclear measurement. Most of the pulse shape differences result from differences in the temporal distribution of the current generated in the detector by the radiation interaction. If a fast linear pulse is generated at the detector with a short acquisition time constant, the pulse shape reproduces the course of this current over time and thus will directly reproduce these differences. In more common applications, the linear trailing pulse obtained by acquiring this current with a large time constant only shows these changes in its leading-edge characteristics. The pulse shape discrimination (PSD) method is designed to detect the differences between such events. Moreover, pulse shape discrimination can also be used to distinguish between fast components and slow components, and signal recovery after pulse pileup. The signal is first distinguished and then recovered, such as signal pileup shown in FIG. 10, and FIG. 11 shows recovery of piled-up signals. The present disclosure outputs nuclear pulse signals containing different rise times, fall times, and amplitudes on the main channel, including nuclear pulse signals with and without pileup, and the output time of different nuclear pulse signals is set to a certain rule, so as to observe the discrimination situation when this signal is detected by the spectrometer. Therefore, the pulse shape discrimination capability of the spectrometer can be tested and calibrated.

Figure 14:
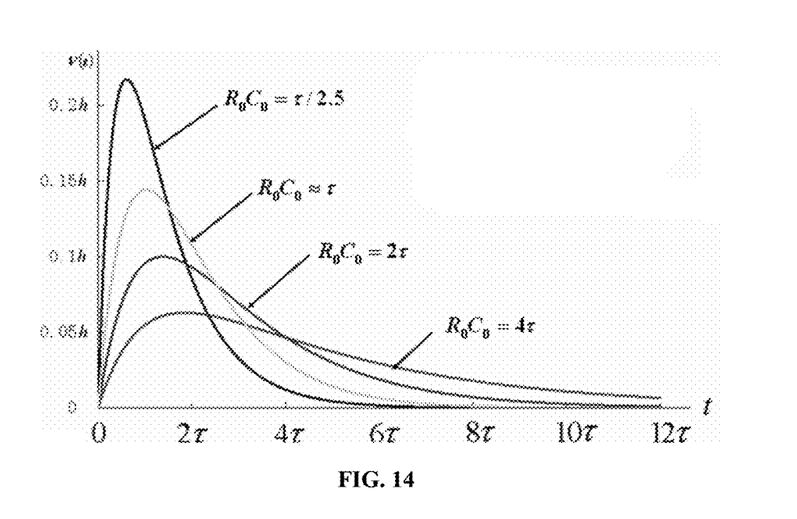
FIG. 14 is a schematic diagram of pulse signals including different rise times, fall times, and amplitudes.

Since the rise time and fall time of the nuclear pulse signal contain different important information, the extraction accuracy of these parameters plays a crucial role in the extraction of information. FIG. 14 shows pulse signals including different rise times, fall times, and amplitudes. The present disclosure outputs the nuclear pulse signal with specific rise time and fall time, and when the spectrometer acquires the nuclear pulse signal, the extraction accuracy of information such as the rise time and fall time by the spectrometer can be calibrated by analyzing the acquired nuclear pulse signal.

Figure 9:
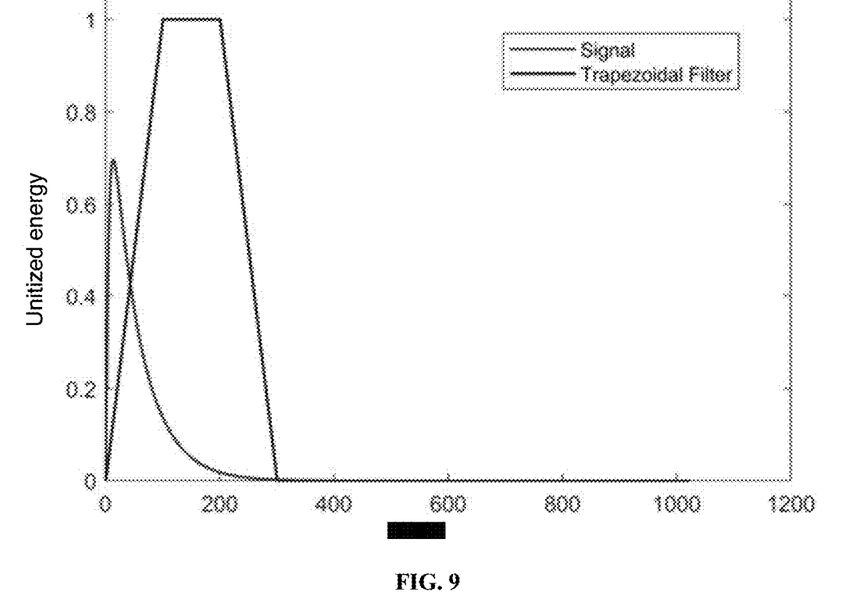
FIG. 9 is a schematic diagram of trapezoidal shaping results of a nuclear pulse signal.

The shaping of the pulse shape is very important for the extraction of the amplitude of the nuclear pulse signal, that is, the extraction of energy, which is also the main parameter of the spectrometer. The extraction accuracy of the amplitude determines the resolution of the spectrometer. FIG. 9 is a shape after trapezoidal shaping. In order to test the signal accuracy acquisition problem of the spectrometer, the present disclosure outputs a nuclear pulse signal with a specific amplitude to the to-be-tested spectrometer. After the spectrometer acquires the nuclear pulse signal and compares it with the original pulse, the signal acquisition accuracy and resolution of the spectrometer can be tested and calibrated.

The present disclosure can test the stability of the spectrometer by testing and calibrating the stability of the spectrometer under the condition of high frequency and long time measurement.

Finally, it should be noted that the above description is only a preferred embodiment of the present disclosure and is not intended to limit the present disclosure. Although the present disclosure has been described in detail with reference to the foregoing embodiments, those skilled in the art can still modify the technical solutions described in the foregoing embodiments, or equivalently substitute some of the technical features of the embodiments. Any modifications, equivalent substitutions, improvements, and the like within the spirit and principle of the present disclosure should fall within the protection scope of the present disclosure.

What is claimed is:

1. A multi-parameter test and calibration system for a spectrometer based on a nanosecond light source, comprising an upper computer, a ZYNQ system-on-chip (SoC) processor, a double data rate 3 (DDR3), an embedded multimedia card (EMMC), a power supply unit, a main channel for outputting nuclear pulse signals, and a coincidence channel for outputting the nuclear pulse signals, wherein the ZYNQ SoC processor comprises an advanced RISC machine (ARM) unit and a field programmable gate array (FPGA) unit, the upper computer is connected to the ZYNQ SoC processor through a network port, the DDR3 and the EMMC are connected to the ZYNQ SoC processor respectively, the ZYNQ SoC processor is connected to the main channel for outputting the nuclear pulse signals and the coincidence channel for outputting the nuclear pulse signals respectively, and the main channel for outputting the nuclear pulse signals is connected to a main channel of the spectrometer and the coincidence channel for outputting the nuclear pulse signals is connected to a coincidence channel of the spectrometer, wherein the main channel for outputting the nuclear pulse signals comprises a digital-to-analog converter (DAC) chip, a differential to single-ended unit, a light-emitting diode (LED), an optical filter, a photomultiplier tube (PMT), a preamplifier, and a to-be-tested spectrometer system; and the DAC is connected to the FPGA unit of the ZYNQ SoC processor, input of the differential to single-ended unit is connected to an output pin of the DAC, output of the differential to single-ended unit is connected to the LED, the optical filter is attached between the PMT and the LED, an output terminal of the PMT is connected to the preamplifier, and the preamplifier is connected to a main channel of the to-be-tested spectrometer system, the coincidence channel for outputting the nuclear pulse signals comprises a DAC chip, a differential to single-ended unit, an LED, an optical filter, a PMT, a preamplifier, and a to-be-tested spectrometer system; and the DAC is connected to the FPGA unit of the ZYNQ SoC processor, input of the differential to single-ended unit is connected to an output pin of the DAC, output of the differential to single-ended unit is connected to the LED, the optical filter is attached between the PMT and the LED, an output terminal of the PMT is connected to the preamplifier, and the preamplifier is connected to a Compton scattering anti-coincidence measurement channel of the to-be-tested spectrometer system.

2. The multi-parameter test and calibration system for a spectrometer based on a nanosecond light source according to claim 1, wherein the ARM unit is connected to the FPGA unit through an AXI bus, and the EMMC is connected to the ARM unit of the ZYNQ SoC processor through a general input-output (IO) port.

3. A test and calibration method for the multi-parameter test and calibration system for a spectrometer based on a nanosecond light source according to claim 2, comprising the following steps:
(1) obtaining, by the upper computer, an energy spectrum curve 1 required for output of the main channel and an energy spectrum curve 2 required for output of the coincidence channel using a large amount of measured data and Monte Carlo simulation according to functions selected by a user;
(2) when the ZYNQ SoC processor obtains the energy spectrum curve 1, inverting the energy spectrum curve 1 into a series of nuclear pulse signals, or directly outputting nuclear pulse signals containing one or more rise times and fall times according to different functions selected by the user, and outputting the nuclear pulse signals at random or fixed time intervals in the main channel after corresponding processing according to different functions;
(3) calculating, by the ZYNQ SoC processor, correlation between the nuclear pulse signals output from the coincidence channel and the nuclear pulse signals of the main channel according to the functions and parameters set by the user;
(4) when the ZYNQ SoC processor obtains the energy spectrum curve 2, inverting the energy spectrum curve 2 into a series of nuclear pulse signals, and outputting the nuclear pulse signals in the coincidence channel according to the correlation between the nuclear pulse signals of the main channel and the nuclear pulse signals of the coincidence channel; and
(5) after the nuclear pulse signals output from each channel are acquired by the to-be-tested spectrometer, comparing acquired information with data generated according to the parameters set by the user, so as to test and calibrate multiple parameters of the spectrometer.

4. The test and calibration method according to claim 3, wherein a method for outputting the nuclear pulse signals from the main channel and the coincidence channel is as follows: converting, by a DAC, digital signals into analog nuclear pulse signals, converting, by a differential to single-ended unit, differential signals into single-ended nuclear pulse signals, converting, by an LED, nuclear pulse current signals into optical signals, converting, by a PMT, the optical signals into electrical signals, conditioning and outputting, by a preamplifier, PMT anode signals, and receiving, by a to-be-tested spectrometer system, the nuclear pulse signals of the two channels and comparing the nuclear pulse signals with the data generated according to the parameters set by the user, so as to test and calibrate multiple parameters of the spectrometer.

5. The test and calibration method according to claim 4, wherein in step (1), the functions selected by the user comprise the calibration and test of multiple parameters such as the coincidence and anti-coincidence performance test and calibration of the spectrometer, the broadening test of a spectral line after spectrometer detection, the resolution test and calibration of the spectrometer, the distortion degree of the spectral line, the test and calibration of the throughput and the counting rate of the spectrometer, the dead time test and calibration of the spectrometer, the baseline restoration capability and direct current (DC) offset accuracy of the spectrometer, the energy detection range of the spectrometer, the spectrum stabilization performance test and calibration of the spectrometer, the signal-to-noise ratio improvement capability of the spectrometer, the working performance test of various preamplifiers, the pulse shape discrimination capability, the accuracy test and calibration of the rise time and fall time of extracted nuclear pulse signals, the effect test of a shaping algorithm, the analysis of signal acquisition accuracy of the spectrometer, and the stability test of the spectrometer.

6. The test and calibration method according to claim 3, wherein in step (2), the corresponding processing is as follows: when the baseline restoration capability of the spectrometer is selected to be tested, coupling a DC offset to the nuclear pulse signal; and when the signal-to-noise ratio improvement capability test function of the spectrometer is selected, coupling high-frequency noise to the nuclear pulse signal, wherein no processing is done when other functions are selected.

7. The multi-parameter test and calibration system for a spectrometer based on a nanosecond light source according to claim 1, wherein the power supply unit is connected to the upper computer, the ZYNQ SoC processor, the DDR3, the EMMC, the main channel for outputting the nuclear pulse signals, and the coincidence channel for outputting the nuclear pulse signals respectively.

8. A test and calibration method for the multi-parameter test and calibration system for a spectrometer based on a nanosecond light source according to claim 7, comprising the following steps:
(1) obtaining, by the upper computer, an energy spectrum curve 1 required for output of the main channel and an energy spectrum curve 2 required for output of the coincidence channel using a large amount of measured data and Monte Carlo simulation according to functions selected by a user;

(2) when the ZYNQ SoC processor obtains the energy spectrum curve 1, inverting the energy spectrum curve 1 into a series of nuclear pulse signals, or directly outputting nuclear pulse signals containing one or more rise times and fall times according to different functions selected by the user, and outputting the nuclear pulse signals at random or fixed time intervals in the main channel after corresponding processing according to different functions;

(3) calculating, by the ZYNQ SoC processor, correlation between the nuclear pulse signals output from the coincidence channel and the nuclear pulse signals of the main channel according to the functions and parameters set by the user;

(4) when the ZYNQ SoC processor obtains the energy spectrum curve 2, inverting the energy spectrum curve 2 into a series of nuclear pulse signals, and outputting the nuclear pulse signals in the coincidence channel according to the correlation between the nuclear pulse signals of the main channel and the nuclear pulse signals of the coincidence channel; and (5) after the nuclear pulse signals output from each channel are acquired by the to-be-tested spectrometer, comparing acquired information with data generated according to the parameters set by the user, so as to test and calibrate multiple parameters of the spectrometer.

9. The test and calibration method according to claim 8, wherein a method for outputting the nuclear pulse signals from the main channel and the coincidence channel is as follows: converting, by a DAC, digital signals into analog nuclear pulse signals, converting, by a differential to single-ended unit, differential signals into single-ended nuclear pulse signals, converting, by an LED, nuclear pulse current signals into optical signals, converting, by a PMT, the optical signals into electrical signals, conditioning and outputting, by a preamplifier, PMT anode signals, and receiving, by a to-be-tested spectrometer system, the nuclear pulse signals of the two channels and comparing the nuclear pulse signals with the data generated according to the parameters set by the user, so as to test and calibrate multiple parameters of the spectrometer.

10. The test and calibration method according to claim 9, wherein in step (1), the functions selected by the user comprise the calibration and test of multiple parameters such as the coincidence and anti-coincidence performance test and calibration of the spectrometer, the broadening test of a spectral line after spectrometer detection, the resolution test and calibration of the spectrometer, the distortion degree of the spectral line, the test and calibration of the throughput and the counting rate of the spectrometer, the dead time test and calibration of the spectrometer, the baseline restoration capability and direct current (DC) offset accuracy of the spectrometer, the energy detection range of the spectrometer, the spectrum stabilization performance test and calibration of the spectrometer, the signal-to-noise ratio improvement capability of the spectrometer, the working performance test of various preamplifiers, the pulse shape discrimination capability, the accuracy test and calibration of the rise time and fall time of extracted nuclear pulse signals, the effect test of a shaping algorithm, the analysis of signal acquisition accuracy of the spectrometer, and the stability test of the spectrometer.

11. The test and calibration method according to claim 8, wherein in step (2), the corresponding processing is as follows: when the baseline restoration capability of the spectrometer is selected to be tested, coupling a DC offset to the nuclear pulse signal; and when the signal-to-noise ratio improvement capability test function of the spectrometer is selected, coupling high-frequency noise to the nuclear pulse signal, wherein no processing is done when other functions are selected.

12. A test and calibration method for the multi-parameter test and calibration system for a spectrometer based on a nanosecond light source according to claim 1, comprising the following steps:

(1) obtaining, by the upper computer, an energy spectrum curve 1 required for output of the main channel and an energy spectrum curve 2 required for output of the coincidence channel using a large amount of measured data and Monte Carlo simulation according to functions selected by a user;

(2) when the ZYNQ SoC processor obtains the energy spectrum curve 1, inverting the energy spectrum curve 1 into a series of nuclear pulse signals, or directly outputting nuclear pulse signals containing one or more rise times and fall times according to different functions selected by the user, and outputting the nuclear pulse signals at random or fixed time intervals in the main channel after corresponding processing according to different functions;

(3) calculating, by the ZYNQ SoC processor, correlation between the nuclear pulse signals output from the coincidence channel and the nuclear pulse signals of the main channel according to the functions and parameters set by the user;

(4) when the ZYNQ SoC processor obtains the energy spectrum curve 2, inverting the energy spectrum curve 2 into a series of nuclear pulse signals, and outputting the nuclear pulse signals in the coincidence channel according to the correlation between the nuclear pulse signals of the main channel and the nuclear pulse signals of the coincidence channel; and (5) after the nuclear pulse signals output from each channel are acquired by the to-be-tested spectrometer, comparing acquired information with data generated according to the parameters set by the user, so as to test and calibrate multiple parameters of the spectrometer.

13. The test and calibration method according to claim 12, wherein a method for outputting the nuclear pulse signals from the main channel and the coincidence channel is as follows: converting, by a DAC, digital signals into analog nuclear pulse signals, converting, by a differential to single-ended unit, differential signals into single-ended nuclear pulse signals, converting, by an LED, nuclear pulse current signals into optical signals, converting, by a PMT, the optical signals into electrical signals, conditioning and outputting, by a preamplifier, PMT anode signals, and receiving, by a to-be-tested spectrometer system, the nuclear pulse signals of the two channels and comparing the nuclear pulse signals with the data generated according to the parameters set by the user, so as to test and calibrate multiple parameters of the spectrometer.

14. The test and calibration method according to claim 13, wherein in step (1), the functions selected by the user comprise the calibration and test of multiple parameters such as the coincidence and anti-coincidence performance test and calibration of the spectrometer, the broadening test of a spectral line after spectrometer detection, the resolution test and calibration of the spectrometer, the distortion degree of the spectral line, the test and calibration of the throughput and the counting rate of the spectrometer, the dead time test and calibration of the spectrometer, the baseline restoration capability and direct current (DC) offset accuracy of the spectrometer, the energy detection range of the spectrometer, the spectrum stabilization performance test and calibration of the spectrometer, the signal-to-noise ratio improvement capability of the spectrometer, the working performance test of various preamplifiers, the pulse shape discrimination capability, the accuracy test and calibration of the rise time and fall time of extracted nuclear pulse signals, the effect test of a shaping algorithm, the analysis of signal acquisition accuracy of the spectrometer, and the stability test of the spectrometer.

15. The test and calibration method according to claim 12, wherein in step (2), the corresponding processing is as follows: when the baseline restoration capability of the spectrometer is selected to be tested, coupling a DC offset to the nuclear pulse signal; and when the signal-to-noise ratio improvement capability test function of the spectrometer is selected, coupling high-frequency noise to the nuclear pulse signal, wherein no processing is done when other functions are selected.

16. A test and calibration method for the multi-parameter test and calibration system for a spectrometer based on a nanosecond light source according to claim 1, comprising the following steps: (1) obtaining, by the upper computer, an energy spectrum curve 1 required for output of the main channel and an energy spectrum curve 2 required for output of the coincidence channel using a large amount of measured data and Monte Carlo simulation according to functions selected by a user; (2) when the ZYNQ SoC processor obtains the energy spectrum curve 1, inverting the energy spectrum curve into a series of nuclear pulse signals, or directly outputting nuclear pulse signals containing one or more rise times and fall times according to different functions selected by the user, and outputting the nuclear pulse signals at random or fixed time intervals in the main channel after corresponding processing according to different functions; (3) calculating, by the ZYNQ SoC processor, correlation between the nuclear pulse signals output from the coincidence channel and the nuclear pulse signals of the main channel according to the functions and parameters set by the user; (4) when the ZYNQ SoC processor obtains the energy spectrum curve 2, inverting the energy spectrum curve 2 into a series of nuclear pulse signals, and outputting the nuclear pulse signals in the coincidence channel according to the correlation between the nuclear pulse signals of the main channel and the nuclear pulse signals of the coincidence channel; and (5) after the nuclear pulse signals output from each channel are acquired by the to-be-tested spectrometer, comparing acquired information with data generated according to the parameters set by the user, so as to test and calibrate multiple parameters of the spectrometer.

17. The test and calibration method according to claim 16, wherein a method for outputting the nuclear pulse signals from the main channel and the coincidence channel is as follows: converting, by a DAC, digital signals into analog nuclear pulse signals, converting, by a differential to single-ended unit, differential signals into single-ended nuclear pulse signals, converting, by an LED, nuclear pulse current signals into optical signals, converting, by a PMT, the optical signals into electrical signals, conditioning and outputting, by a preamplifier, PMT anode signals, and receiving, by a to-be-tested spectrometer system, the nuclear pulse signals of the two channels and comparing the nuclear pulse signals with the data generated according to the parameters set by the user, so as to test and calibrate multiple parameters of the spectrometer.

18. The test and calibration method according to claim 17, wherein in step (1), the functions selected by the user comprise the calibration and test of multiple parameters such as the coincidence and anti-coincidence performance test and calibration of the spectrometer, the broadening test of a spectral line after spectrometer detection, the resolution test and calibration of the spectrometer, the distortion degree of the spectral line, the test and calibration of the throughput and the counting rate of the spectrometer, the dead time test and calibration of the spectrometer, the baseline restoration capability and direct current (DC) offset accuracy of the spectrometer, the energy detection range of the spectrometer, the spectrum stabilization performance test and calibration of the spectrometer, the signal-to-noise ratio improvement capability of the spectrometer, the working performance test of various preamplifiers, the pulse shape discrimination capability, the accuracy test and calibration of the rise time and fall time of extracted nuclear pulse signals, the effect test of a shaping algorithm, the analysis of signal acquisition accuracy of the spectrometer, and the stability test of the spectrometer.

19. The test and calibration method according to claim 16, wherein in step (2), the corresponding processing is as follows: when the baseline restoration capability of the spectrometer is selected to be tested, coupling a DC offset to the nuclear pulse signal; and when the signal-to-noise ratio improvement capability test function of the spectrometer is selected, coupling high-frequency noise to the nuclear pulse signal, wherein no processing is done when other functions are selected.

* * * * *